United States Patent
Aboeloula et al.

(10) Patent No.: US 12,224,951 B2
(45) Date of Patent: Feb. 11, 2025

(54) DYNAMIC RESOURCE RESERVATION PROTOCOL RESOURCE HANDLING AND DEADLOCK AVOIDANCE

(71) Applicant: Juniper Networks, Inc., Sunnyvale, CA (US)

(72) Inventors: Alaa Aboeloula, Acton, MA (US); Sheetal Pukhraj Jangeed, Navi Mumbai (IN); Tomasz Kazmierczak, Manassas, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 50 days.

(21) Appl. No.: 18/087,450

(22) Filed: Dec. 22, 2022

(65) Prior Publication Data

US 2024/0214325 A1 Jun. 27, 2024

(51) Int. Cl.
*H04L 47/74* (2022.01)
*H04L 47/10* (2022.01)
*H04L 47/70* (2022.01)

(52) U.S. Cl.
CPC ............ *H04L 47/746* (2013.01); *H04L 47/10* (2013.01); *H04L 47/745* (2013.01); *H04L 47/822* (2013.01)

(58) Field of Classification Search
None
See application file for complete search history.

(56) References Cited

U.S. PATENT DOCUMENTS

| | | | |
|---|---|---|---|
| 8,913,490 B1 * | 12/2014 | Barman | H04L 45/50 370/312 |
| 10,171,463 B1 * | 1/2019 | Wiger | H04L 63/126 |
| 11,233,748 B1 * | 1/2022 | Deshmukh | H04L 41/0896 |
| 2022/0014422 A1 * | 1/2022 | Gupta Hyde | H04L 41/069 |
| 2022/0191128 A1 * | 6/2022 | Alverson | H04L 45/123 |
| 2023/0116614 A1 * | 4/2023 | Shi | H04L 45/50 370/252 |
| 2023/0117644 A1 * | 4/2023 | Kamisetty | H04L 49/354 370/254 |
| 2023/0188477 A1 * | 6/2023 | Zeng | H04L 47/762 709/218 |
| 2023/0262098 A1 * | 8/2023 | Muñoz De La Torre Alonso | H04L 47/822 709/224 |

FOREIGN PATENT DOCUMENTS

| | | |
|---|---|---|
| CN | 102843726 A | 12/2012 |
| EP | 3739828 A1 | 11/2020 |

OTHER PUBLICATIONS

Extended European Search Report for Application No. EP23159302.1, mailed on Aug. 14, 2023, 29 Pages.

* cited by examiner

*Primary Examiner* — Jeffrey R Swearingen
(74) *Attorney, Agent, or Firm* — Harrity & Harrity, LLP (57) ABSTRACT

A network device may receive transport layer messages from an ingress network device, and may determine whether a quantity of resources required for processing the transport layer messages exceeds a threshold level of available resources of the network device. The network device may generate a transport layer path error message based on the quantity of resources required for processing the transport layer messages exceeding the threshold level of available resources. The network device may provide the transport layer path error message to the ingress network device to prevent the ingress network device from providing additional transport layer messages to the network device.

20 Claims, 8 Drawing Sheets

DYNAMIC RESOURCE RESERVATION PROTOCOL RESOURCE HANDLING AND DEADLOCK AVOIDANCE

BACKGROUND

The resource reservation protocol (RSVP) is a transport layer protocol designed to reserve resources across a network using an integrated services model. The RSVP operates over Internet protocol version 4 (IPv4) or IP version 6 (IPv6) and provides receiver-initiated setup of resource reservations for multicast or unicast data flows.

SUMMARY

Some implementations described herein relate to a method. The method may include receiving transport layer messages from an ingress network device, and determining whether a quantity of resources required for processing the transport layer messages exceeds a threshold level of available resources of the network device. The method may include generating a transport layer path error message based on the quantity of resources required for processing the transport layer messages exceeding the threshold level of available resources. The method may include providing the transport layer path error message to the ingress network device to prevent the ingress network device from providing additional transport layer messages to the network device.

Some implementations described herein relate to a network device. The network device may include one or more memories and one or more processors. The one or more processors may be configured to receive transport layer messages from an ingress network device, and determine whether a quantity of resources required for processing the transport layer messages exceeds a threshold level of available resources of the network device. The one or more processors may be configured to selectively process the transport layer messages, to generate processed transport layer messages, based on the quantity of resources required for processing the transport layer messages failing to exceed the threshold level of available resources, and provide the processed transport layer messages to an egress network device; or generate a transport layer path error message based on the quantity of resources required for processing the transport layer messages exceeding the threshold level of available resources, and provide the transport layer path error message to the ingress network device to prevent the ingress network device from providing additional transport layer messages to the network device.

Some implementations described herein relate to a non-transitory computer-readable medium that stores a set of instructions for a network device. The set of instructions, when executed by one or more processors of the network device, may cause the network device to receive transport layer messages from an ingress network device, and determine whether a quantity of resources required for processing the transport layer messages exceeds a threshold level of available resources of the network device. The set of instructions, when executed by one or more processors of the network device, may cause the network device to generate a transport layer path error message based on the quantity of resources required for processing the transport layer messages exceeding the threshold level of available resources, and provide the transport layer path error message to the ingress network device to prevent the ingress network device from providing additional transport layer messages to the network device. The set of instructions, when executed by one or more processors of the network device, may cause the network device to process the transport layer messages, to generate processed transport layer messages, after providing the transport layer path error message to the ingress network device, and provide the processed transport layer messages to an egress network device.

DETAILED DESCRIPTION

The following detailed description of example implementations refers to the accompanying drawings. The same reference numbers in different drawings may identify the same or similar elements.

The RSVP is widely used for traffic engineering. In a highly scaled environment and during a massive multi-protocol label switching (MPLS) label-switched path (LSP) convergence, a large quantity of RSVP messages (e.g., control packets) are exchanged between peers. The large quantity of RSVP messages may be subject to packet drops, packet delays, and queuing, which may result in RSVP session timeouts that trigger generic backoff mechanisms. If this situation continues, a deadlock situation may occur, where no further RSVP messages are processed, resulting in a network outage. Such network outages are difficult to troubleshoot, due to a large quantity of network devices and different customer arrangements of network devices. Thus, current techniques for processing a large quantity of RSVP messages consume computing resources (e.g., processing resources, memory resources, communication resources, and/or the like), networking resources, and/or the like, associated with delaying traffic transmission through a network due to RSVP resource overutilization and deadlock, losing traffic due to RSVP resource overutilization and deadlock, handling lost traffic caused by RSVP resource overutilization and deadlock, preventing traffic transmission by customers, and/or the like.

Some implementations described herein relate to a network device that provides dynamic RSVP resource handling and deadlock avoidance. For example, a network device may receive transport layer messages from an ingress network device, and may determine whether a quantity of resources required for processing the transport layer messages exceeds a threshold level of available resources of the network device. The network device may generate a transport layer path error message based on the quantity of resources required for processing the transport layer messages exceeding the threshold level of available resources. The network device may provide the transport layer path error message to the ingress network device to prevent the ingress network device from providing additional transport layer messages to the network device.

In this way, the network device provides dynamic RSVP resource handling and deadlock avoidance. For example, a network device may handle a substantial increase of RSVP messages in a dynamic fashion when the network device is low on RSVP resources or under other conditions that result in RSVP messages not being processed in a timely manner. The network device may generate an RSVP path error message indicating, to peer network devices, that the network device is under processing stress conditions. The RSVP path error message may cause the peer network devices to stop providing additional RSVP messages to the network device so that the network device may process existing RSVP messages in a timely manner. Thus, the network device conserves computing resources, networking resources, and/or that like that would otherwise have been consumed by delaying traffic transmission through a network due to RSVP resource overutilization and deadlock, losing traffic due to RSVP resource overutilization and deadlock, handling lost traffic caused by RSVP resource overutilization and deadlock, preventing traffic transmission by customers, and/or the like.

FIGS. 1A-1D are diagrams of an example 100 associated with providing dynamic RSVP resource handling and deadlock avoidance. As shown in FIGS. 1A-1D, example 100 includes endpoint devices and a network of network devices. Further details of the endpoint devices, the network, and the network devices are provided elsewhere herein. Although implementations are described in connection with a single network device, the implementations may be applied to all of the network devices of the network. Furthermore, although implementations are described herein in connection with the RSVP, the implementations may be applied to other protocols.

Figure 1A:
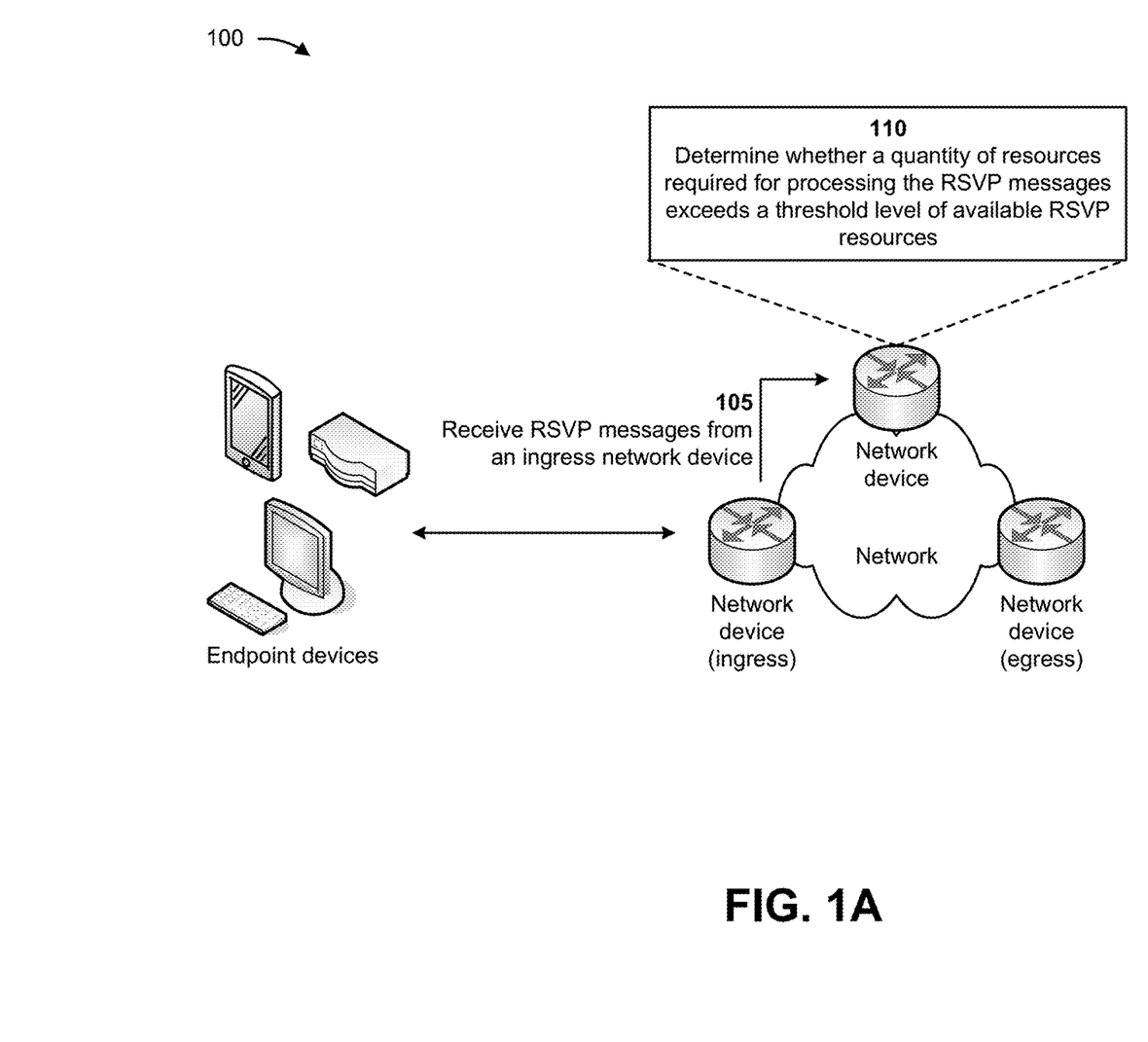
FIGS. 1A-1D are diagrams of an example associated with providing dynamic RSVP resource handling and deadlock avoidance.

As shown in FIG. 1A, and by reference number 105, the network device may receive RSVP messages from an ingress network device. For example, the endpoint devices may utilize the network devices of the network to transmit and receive traffic (e.g., data flows). In order to process the traffic, the network devices of the network may exchange RSVP messages to reserve resources across the network using an integrated services model. In some implementations, the ingress network device may generate RSVP messages, and may provide the RSVP messages to the network device. The network device may receive the RSVP messages from the ingress network device. The RSVP messages may include IPv4 or IPv6 messages that cause the network device to initiate setup of resource reservations for the traffic. In some implementations, the RSVP messages may be received from the ingress network device during an MPLS LSP convergence.

As further shown in FIG. 1A, and by reference number 110, the network device may determine whether a quantity of resources required for processing the RSVP messages exceeds a threshold level of available RSVP resources. For example, the network device may analyze the RSVP messages to determine a quantity of the RSVP messages, and may determine a quantity of resources (e.g., processing resources of the network device) required for processing the RSVP messages. The threshold level of available RSVP resources may include a threshold quantity of available RSVP resources (e.g., packet queues, packet queue limits, packet queue sizes, and/or the like) of the network device to process incoming RSVP messages and provide the processed incoming RSVP messages to an RSVP neighbor network device in a timely manner (e.g., in seconds, minutes, and/or the like). In some implementations, the threshold level of available RSVP resources may be 70%, 80%, 90%, less than 100%, and/or the like of the available RSVP resources of the network device. In some implementations, an operator of the network may set the threshold level of available RSVP resources via a command-line interface (CLI) message, or the threshold level of available RSVP resources may be hard coded in software of the network device. In some implementations, the network device may monitor and utilize other factors to determine whether the network device may process the RSVP messages in a timely manner (e.g., and avoid a deadlock situation), such as link bandwidth of the network device, and/or the like.

In some implementations, the network device may determine that the quantity of resources required for processing the RSVP messages fails to exceed the threshold level of available RSVP resources. In such implementations, the network device may include enough available RSVP resources to process the RSVP messages in a timely manner. Alternatively, the network device may determine that the quantity of resources required for processing the RSVP messages exceeds the threshold level of available RSVP resources. In such implementations, the network device may not include enough available RSVP resources to process the RSVP messages in a timely manner.

Figure 1B:
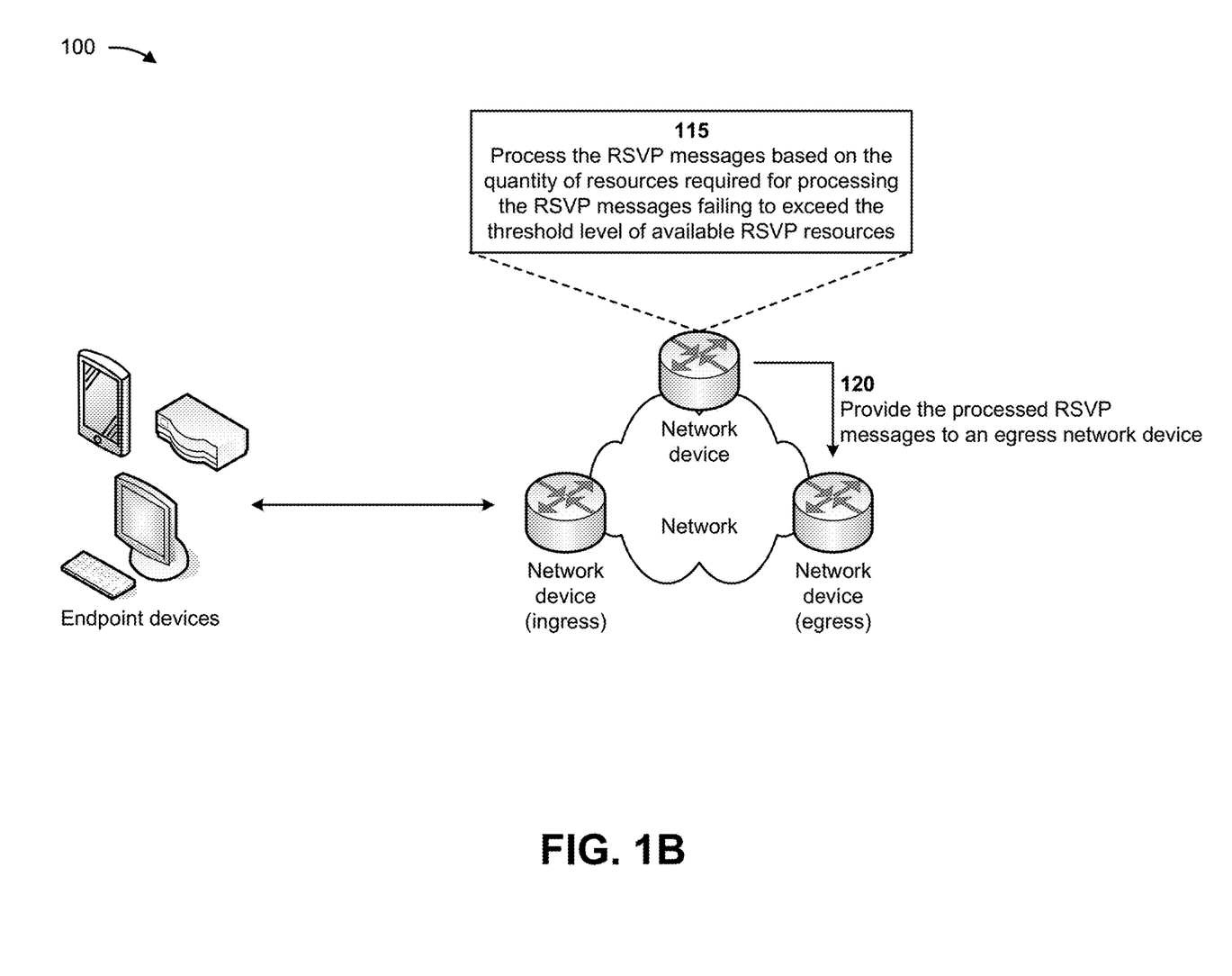

As shown in FIG. 1B, and by reference number 115, the network device may process the RSVP messages based on the quantity of resources required for processing the RSVP messages failing to exceed the threshold level of available RSVP resources. For example, when the network device determines that the quantity of resources required for processing the RSVP messages fails to exceed the threshold level of available RSVP resources, the network device may include enough available RSVP resources to process the RSVP messages in a timely manner. Thus, the network device may utilize the RSVP resources to process the RSVP messages. In some implementations, the network device may process the RSVP messages by changing an address of the RSVP messages to an address of a next egress network device associated with the RSVP messages.

As further shown in FIG. 1B, and by reference number 120, the network device may provide the processed RSVP messages to an egress network device. For example, the network device may process the RSVP messages to generate processed RSVP messages, and may provide the processed RSVP messages to the egress network device. The egress network device may receive the processed RSVP messages and may perform similar functionality on the processed RSVP messages as described herein for the network device.

Figure 1C:
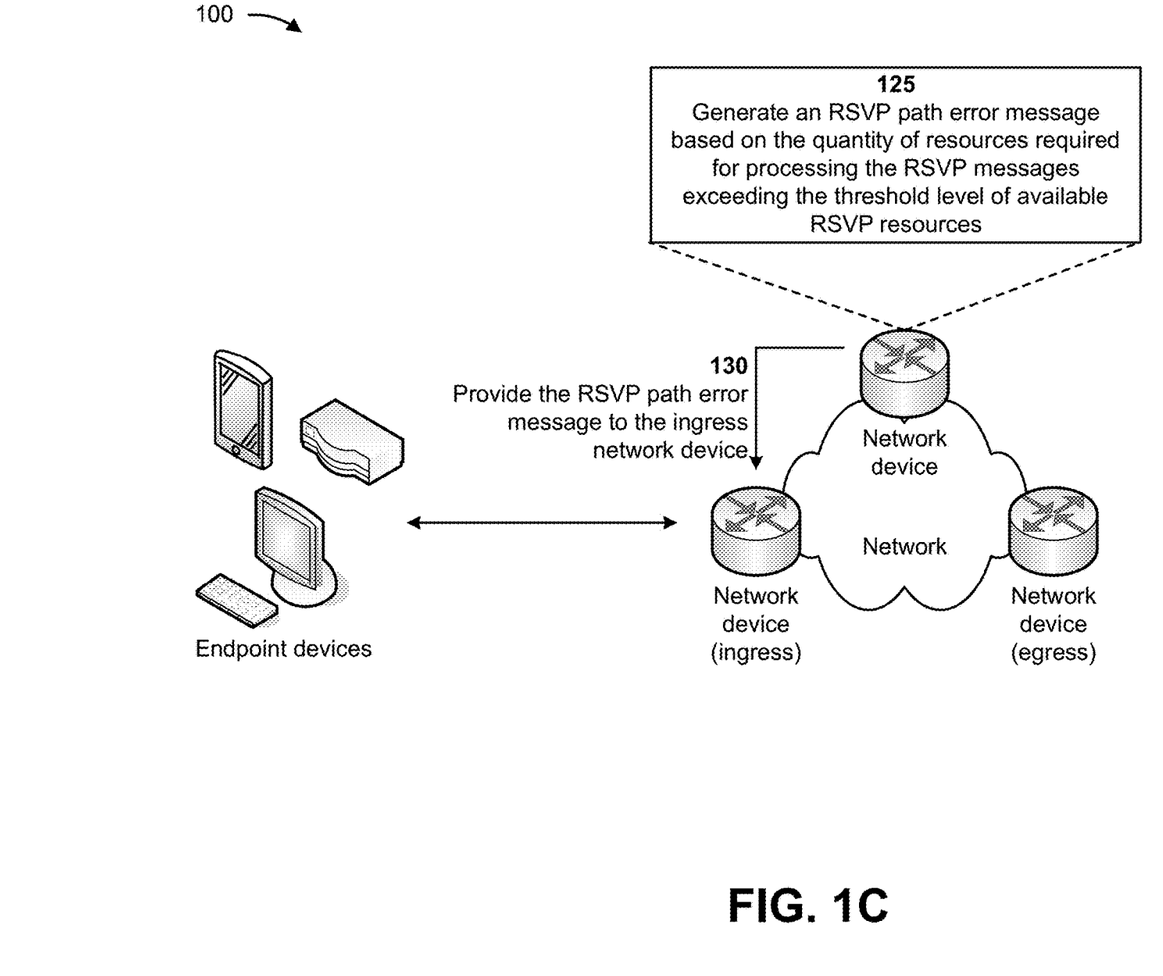

As shown in FIG. 1C, and by reference number 125, the network device may generate an RSVP path error message based on the quantity of resources required for processing the RSVP messages exceeding the threshold level of available RSVP resources. For example, when the network device determines that the quantity of resources required for processing the RSVP messages exceeds the threshold level of available RSVP resources, the network device may not include enough available RSVP resources to process the RSVP messages in a timely manner. Thus, the network device may generate an RSVP path error message to prevent the network device from entering an RSVP deadlock situation and/or creating a bottleneck. In some implementations, the RSVP path error message may include a message that causes the ingress network device to determine a new path for additional RSVP messages that avoids the network device, a message that causes the ingress network device to wait for a time period (e.g., in seconds, minutes, and/or the like) before sending additional RSVP messages to the network device, a message that indicates to the ingress network device that the network device is unable to timely process additional RSVP messages, and/or the like. In some implementations, the RSVP path error message may be included as an extension to another RSVP path error message, and may include an error code and a name, such as "Sub-code 19—RSVP internal node resource unavailable."

As further shown in FIG. 1C, and by reference number 130, the network device may provide the RSVP path error message to the ingress network device. For example, the network device may provide the RSVP path error message to the ingress network device, and the ingress network device may receive the RSVP path error message. In some implementations, the network device may provide the RSVP path error message to other ingress network devices that provided RSVP messages to the network device. In some implementations, the network device may process the RSVP messages, to generate processed RSVP messages, after providing the RSVP path error message to the ingress network device, and may provide the processed RSVP messages to the egress network device.

Figure 1D:
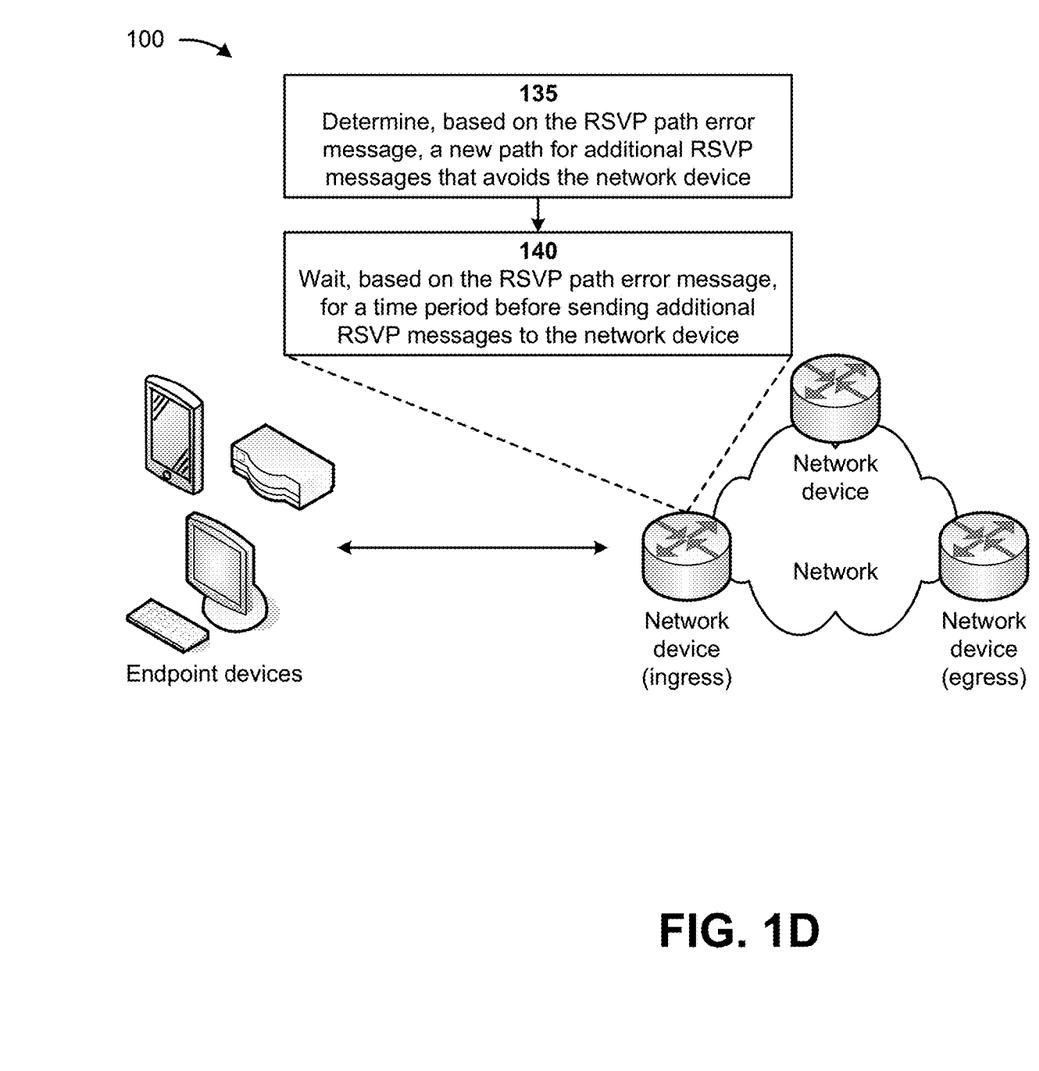

As shown in FIG. 1D, and by reference number 135, the ingress network device may determine, based on the RSVP path error message, a new path for additional RSVP messages that avoids the network device. For example, the RSVP path error message may cause the ingress network device to determine a new path (e.g., a constrained shortest path first (CSPF) calculation) for additional RSVP messages. The new path may not include the network device so that the network device may process the RSVP messages in a timely manner and avoid a deadlock situation. The ingress network device may provide the additional RSVP messages to one or more other network devices associated with the new path. In some implementations, the ingress network device may utilize the new path for the additional RSVP messages for a time period (e.g., in seconds, minutes, and/or the like).

As further shown in FIG. 1D, and by reference number 140, the ingress network device may wait, based on the RSVP path error message, for a time period before sending additional RSVP messages to the network device. For example, if the ingress network device is unable to determine a new path for the additional RSVP messages that avoids the network device, the RSVP path error message may cause the ingress network device to wait for a time period (e.g., in seconds, minutes, and/or the like) before sending the additional RSVP messages to the network device. The ingress network device may provide the additional RSVP messages to the network device after expiration of the time period. This may ensure that an RSVP internal resource exhaustion situation is avoided at the network device due to excessive RSVP messages being received by the network device.

In this way, the network device provides dynamic RSVP resource handling and deadlock avoidance. For example, the network device may handle a substantial increase of RSVP messages in a dynamic fashion when the network device is low on RSVP resources or experiencing other conditions that result in RSVP messages not being processed in a timely manner. The network device may generate an RSVP path error message indicating, to peer network devices, that the network device is under processing stress conditions. The RSVP path error message may cause the peer network devices to stop providing additional RSVP messages to the network device so that the network device may process existing RSVP messages in a timely manner. Thus, the network device conserves computing resources, networking resources, and/or the like that would otherwise have been consumed by delaying traffic transmission through a network due to RSVP resource overutilization and deadlock, losing traffic due to RSVP resource overutilization and deadlock, handling lost traffic caused by RSVP resource overutilization and deadlock, preventing traffic transmission by customers, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
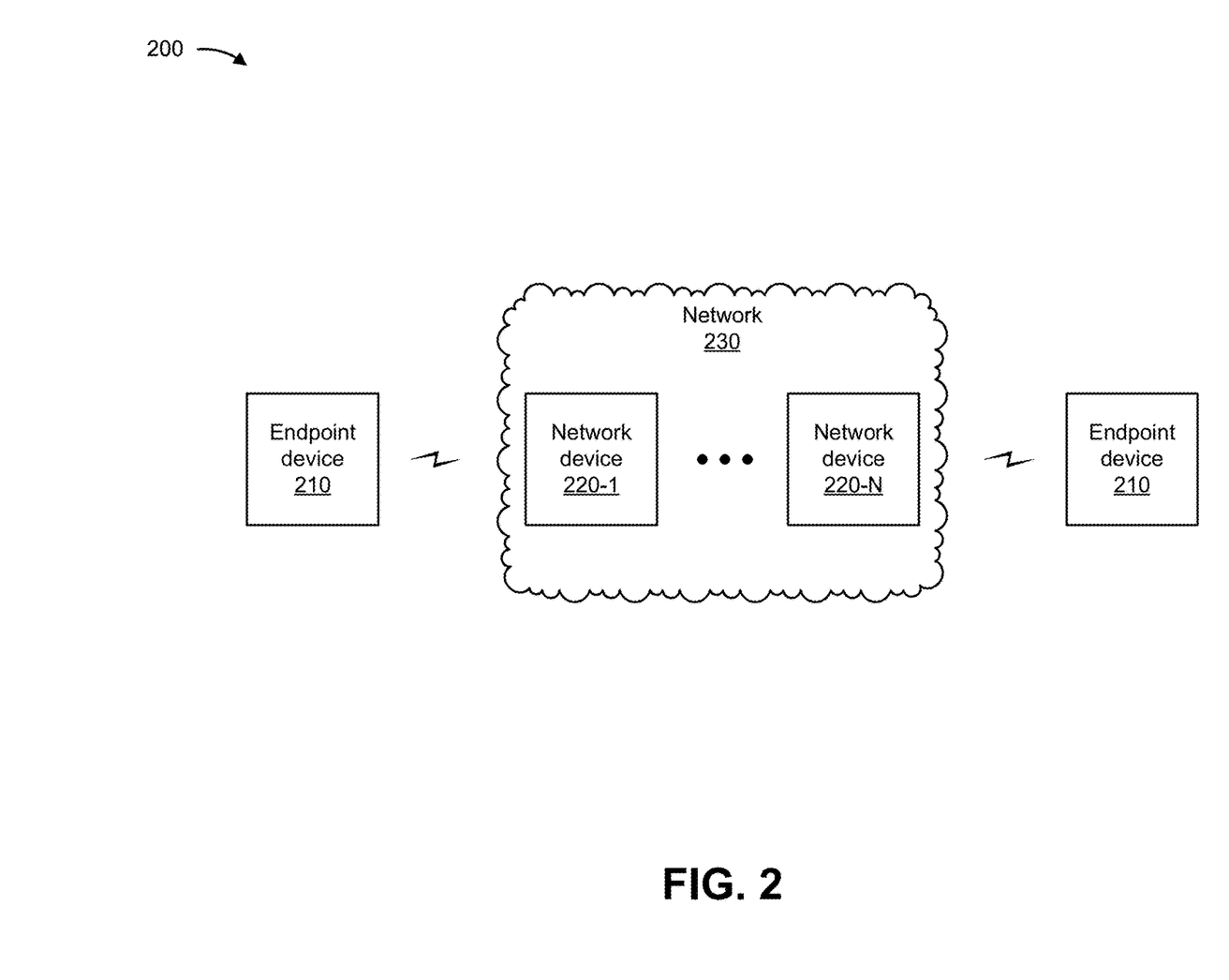
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of endpoint devices 210, a group of network devices 220 (shown as network device 220-1 through network device 220-N), and a network 230. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210, via the network 230 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 230.

The network 230 includes one or more wired and/or wireless networks. For example, the network 230 may include a packet switched network, a cellular network (e.g., a fifth generation (5G) network, a fourth generation (4G) network, such as a long-term evolution (LTE) network, a third generation (3G) network, and/or the like), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
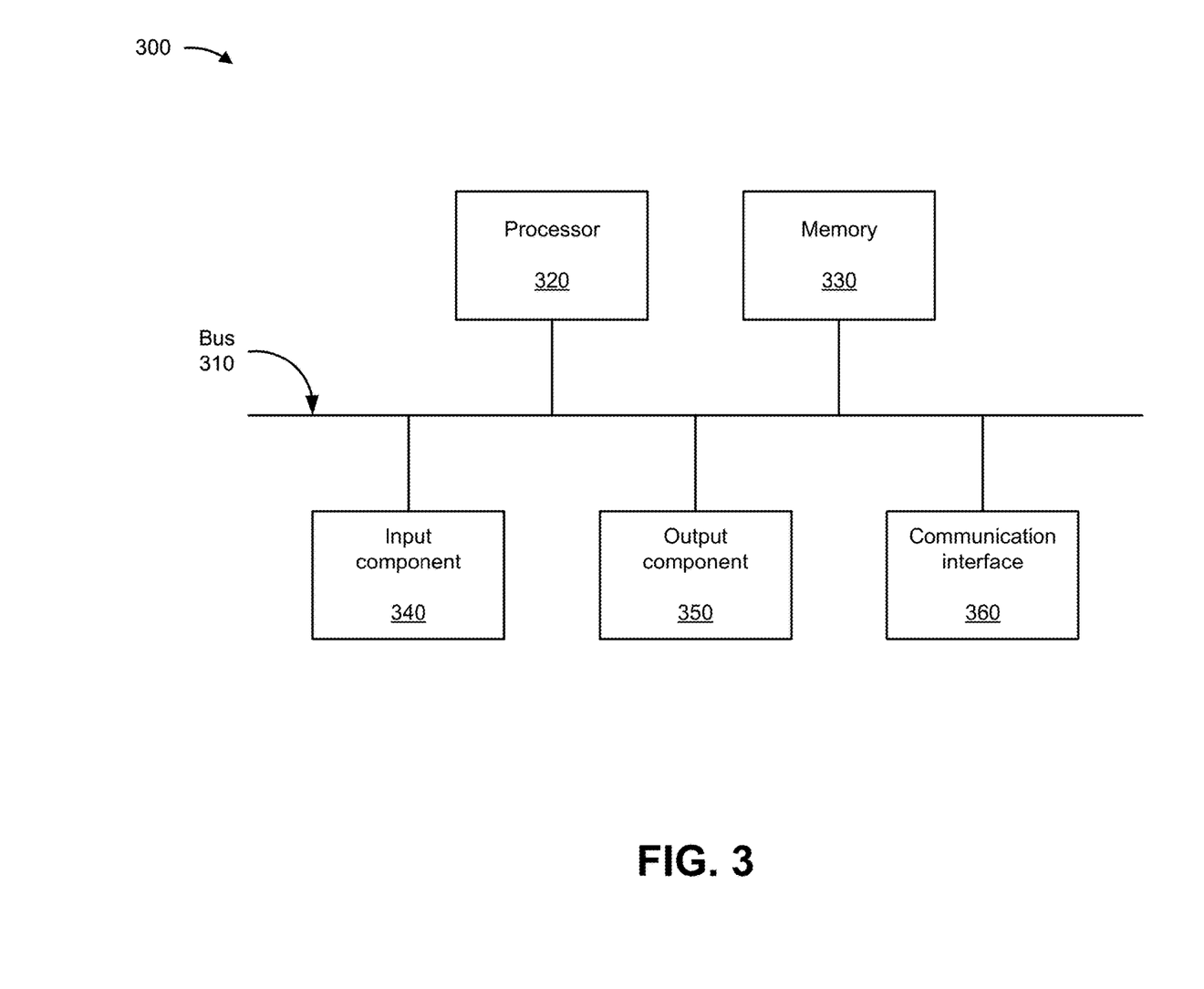
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210 and/or the network device 220. In some implementations, the endpoint device 210 and/or the network device 220 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
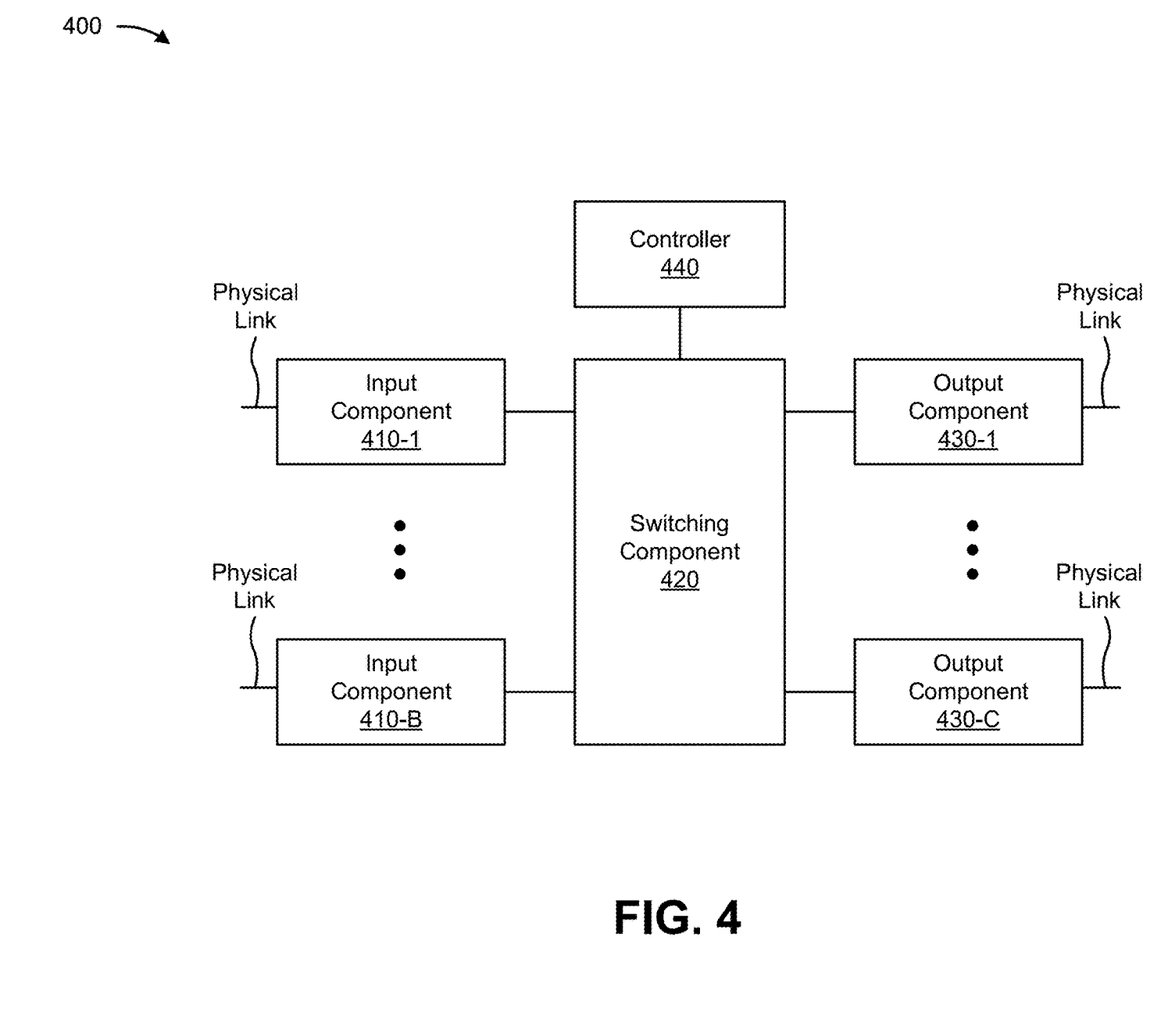

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
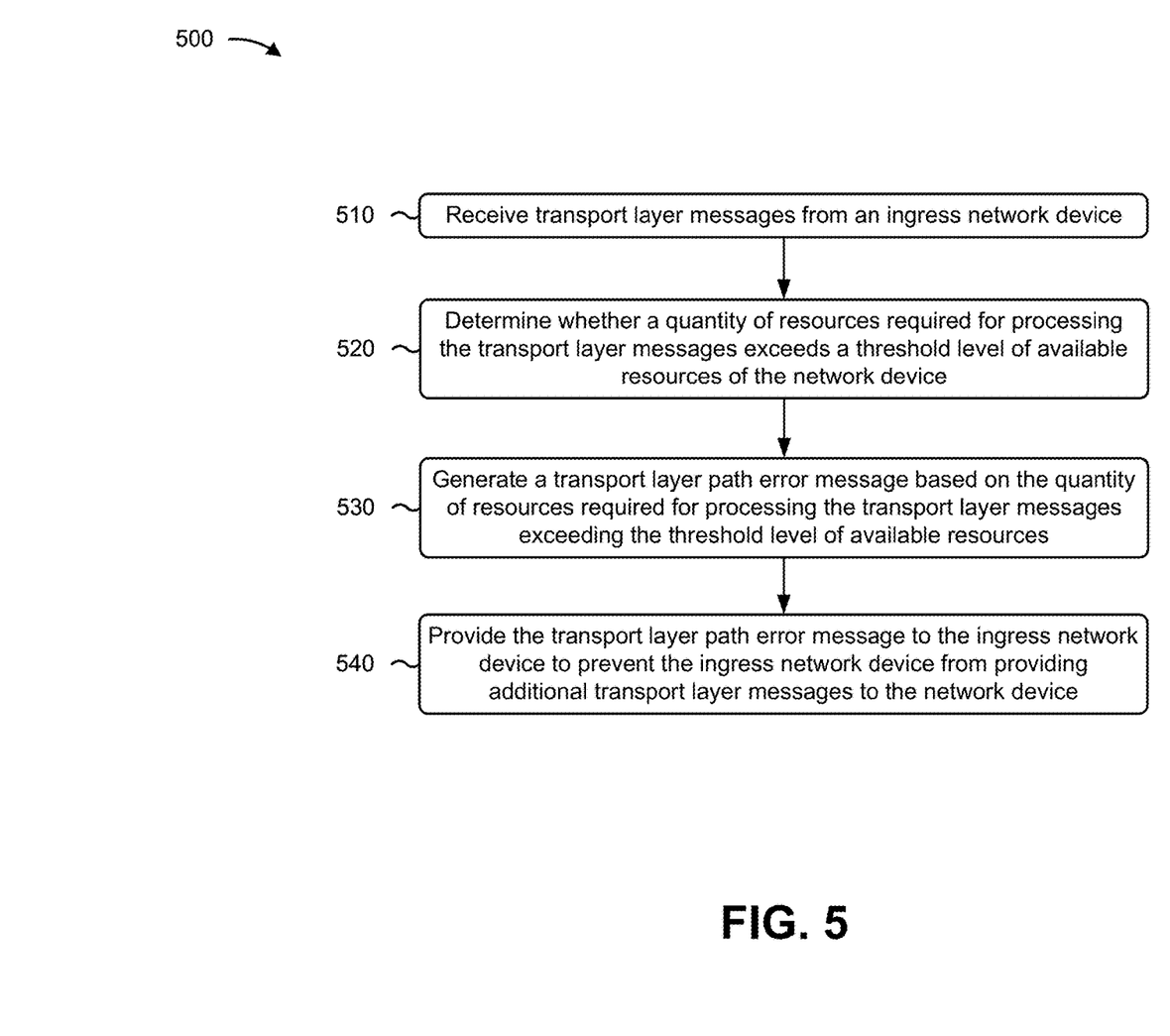
FIG. 5 is a flowchart of an example process for providing dynamic RSVP resource handling and deadlock avoidance.

FIG. 5 is a flowchart of an example process 500 for providing dynamic RSVP resource handling and deadlock avoidance. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving transport layer messages from an ingress network device (block 510). For example, the network device may receive transport layer messages from an ingress network device, as described above. In some implementations, the transport layer messages are resource reservation protocol messages. In some implementations, the transport layer messages are received from the ingress network device during an MPLS LSP convergence.

As further shown in FIG. 5, process 500 may include determining whether a quantity of resources required for processing the transport layer messages exceeds a threshold level of available resources of the network device (block 520). For example, the network device may determine whether a quantity of resources required for processing the transport layer messages exceeds a threshold level of available resources of the network device, as described above. In some implementations, the threshold level of available resources of the network device is less than one hundred percent. In some implementations, the threshold level of available resources of the network device is set to a level so that the network device is capable of processing the transport layer messages. In some implementations, the available resources include resources of the network device that are reserved for processing the transport layer messages. In some implementations, the available resources include resources of the network device that are reserved for processing resource reservation protocol messages.

As further shown in FIG. 5, process 500 may include generating a transport layer path error message based on the quantity of resources required for processing the transport layer messages exceeding the threshold level of available resources (block 530). For example, the network device may generate a transport layer path error message based on the quantity of resources required for processing the transport layer messages exceeding the threshold level of available resources, as described above. In some implementations, the transport layer path error message is included as extension to another transport layer path error message.

As further shown in FIG. 5, process 500 may include providing the transport layer path error message to the ingress network device to prevent the ingress network device from providing additional transport layer messages to the network device (block 540). For example, the network device may provide the transport layer path error message to the ingress network device to prevent the ingress network device from providing additional transport layer messages to the network device, as described above. In some implementations, the transport layer path error message causes the ingress network device to determine a new path for the additional transport layer messages that avoids the network device. In some implementations, the transport layer path error message causes the ingress network device to wait for a time period before sending the additional transport layer messages to the network device.

In some implementations, process 500 includes processing the transport layer messages, to generate processed transport layer messages, based on the quantity of resources required for processing the transport layer messages failing to exceed the threshold level of available resources; and providing the processed transport layer messages to an egress network device.

In some implementations, process 500 includes processing the transport layer messages, to generate processed transport layer messages, after providing the transport layer path error message to the ingress network device; and providing the processed transport layer messages to the egress network device.

In some implementations, process 500 includes providing the transport layer path error message to another ingress network device to prevent another ingress network device from providing additional transport layer messages to the network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by one or more network devices or systems, network communication messages from an ingress network device,
   wherein the network communication messages cause the one or more network devices or systems to initiate setup of resource reservations for communicating traffic through a network that includes the one or more network devices or systems and the ingress network device;
   determining, by the one or more network devices or systems, whether a quantity of resources required for processing the network communication messages to generate processed network communication messages exceeds a threshold level of available resources of the one or more network devices or systems;
   generating, by the one or more network devices or systems, one or more error or control messages based on the quantity of resources required for processing the network communication messages exceeding the threshold level of available resources; and
   providing, by the one or more network devices or systems, the one or more error or control messages to the ingress network device to prevent the ingress network device from providing additional network communication messages to the one or more network devices or systems.

2. The method of claim 1, wherein the network communication messages are resource reservation protocol messages.

3. The method of claim 1, further comprising:
processing the network communication messages, to generate the processed network communication messages; and
providing the processed network communication messages to an egress network device.

4. The method of claim 1, wherein the one or more error or control messages causes the ingress network device to determine a new path for the additional network communication messages that avoids the one or more network devices or systems.

5. The method of claim 1, wherein the one or more error or control messages causes the ingress network device to wait for a time period before sending the additional network communication messages to the one or more network devices or systems.

6. The method of claim 1, wherein the threshold level of available resources of the one or more network devices or systems is less than one hundred percent.

7. The method of claim 1, wherein the one or more error or control messages is included as extension to another error or control message.

8. A network device, comprising:
one or more memories; and
one or more processors to:
receive network communication messages from an ingress network device,
wherein the network communication messages cause the network device to initiate setup of resource reservations for communicating traffic through a network that includes the network device and the ingress network device;
determine whether a quantity of resources required for processing the network communication messages to generate processed network communication messages exceeds a threshold level of available resources of the network device; and
selectively:
process the network communication messages, to generate the processed network communication messages, based on the quantity of resources required for processing the network communication messages failing to exceed the threshold level of available resources, and provide the processed network communication messages to an egress network device; or
generate an error or control message based on the quantity of resources required for processing the network communication messages exceeding the threshold level of available resources, and provide the error or control message to the ingress network device to prevent the ingress network device from providing additional network communication messages to the network device.

9. The network device of claim 8, wherein the one or more processors are further to:
process the network communication messages, to generate the processed network communication messages, after providing the error or control message to the ingress network device; and
provide the processed network communication messages to the egress network device.

10. The network device of claim 8, wherein the network communication messages are received from the ingress network device during a multi-protocol label switching label-switched path convergence.

11. The network device of claim 8, wherein the threshold level of available resources of the network device is set to a level so that the network device is capable of processing the network communication messages.

12. The network device of claim 8, wherein the available resources include resources of the network device that are reserved for processing the network communication messages.

13. The network device of claim 8, wherein the available resources include resources of the network device that are reserved for processing resource reservation protocol messages.

14. The network device of claim 8, wherein the one or more processors are further to:
provide the error or control message to another ingress network device to prevent another ingress network device from providing additional network communication messages to the network device.

15. A non-transitory computer-readable medium storing a set of instructions, the set of instructions comprising:
one or more instructions that, when executed by one or more processors of a network device, cause the network device to:
receive network communication messages from an ingress network device,
wherein network communication the messages cause the network device to initiate setup of resource reservations for communicating traffic through a network that includes the network device and the ingress network device;
determine whether a quantity of resources required for processing the network communication messages to generate processed network communication messages exceeds a threshold level of available resources of the network device;
generate an error or control message based on the quantity of resources required for processing the network communication messages exceeding the threshold level of available resources;
provide the error or control message to the ingress network device to prevent the ingress network device from providing additional network communication messages to the network device;
process the network communication messages, to generate the processed network communication messages, after providing the error or control message to the ingress network device; and
provide the processed network communication messages to an egress network device.

16. The non-transitory computer-readable medium of claim 15, wherein the network communication messages are resource reservation protocol messages.

17. The non-transitory computer-readable medium of claim 15, wherein the available resources include resources of the network device that are reserved for processing the network communication messages.

18. The non-transitory computer-readable medium of claim 15, wherein the error or control message causes the ingress network device to determine a new path for the additional network communication messages that avoids the network device.

19. The non-transitory computer-readable medium of claim 15, wherein the path error or control message causes the ingress network device to wait for a time period before sending the additional network communication messages to the network device.

20. The non-transitory computer-readable medium of claim 15, wherein the network communication messages are received from the ingress network device during a multi-protocol label switching label-switched path convergence.

\* \* \* \* \*